United States Patent Office 3,161,471
Patented Dec. 15, 1964

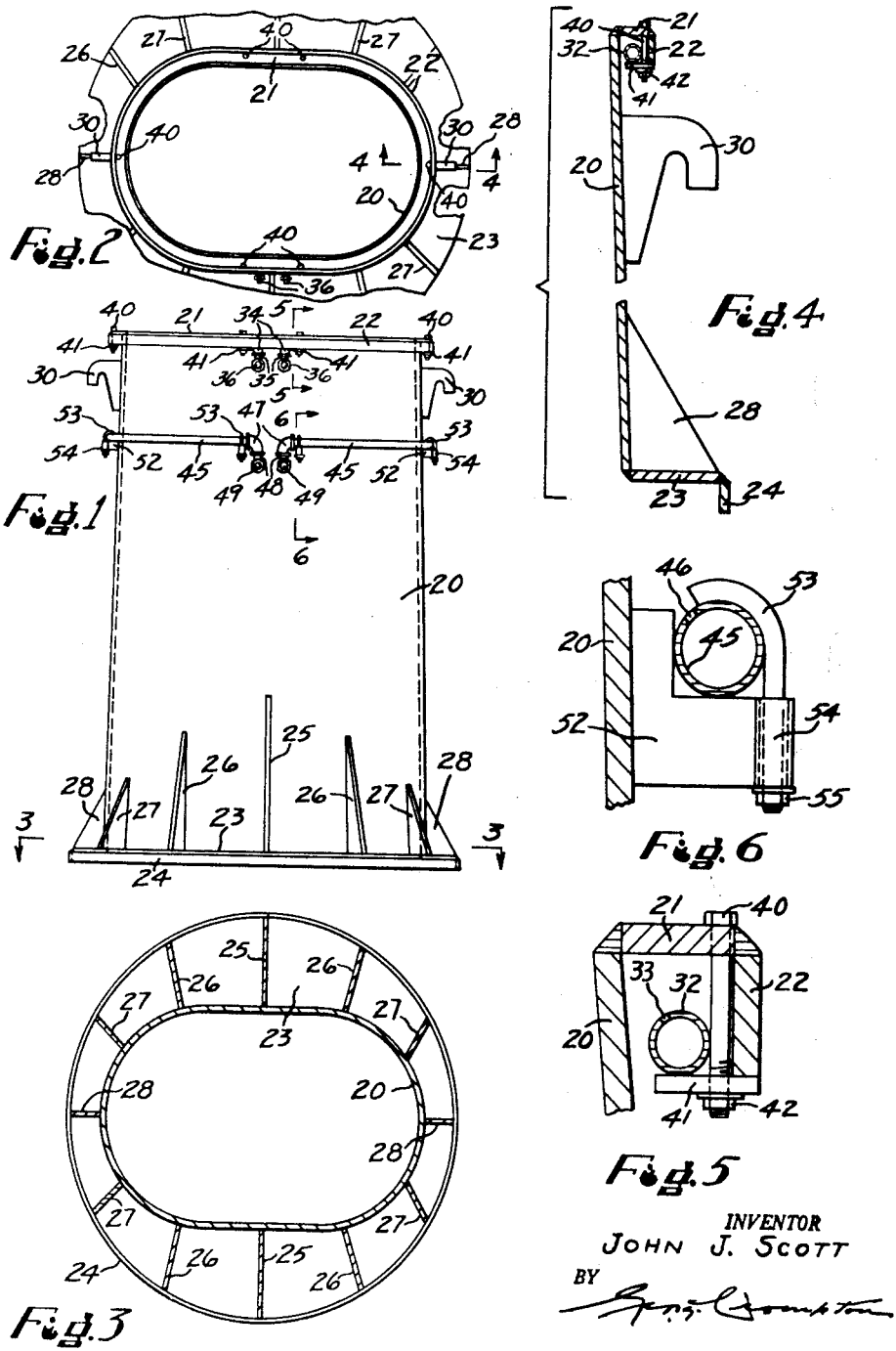

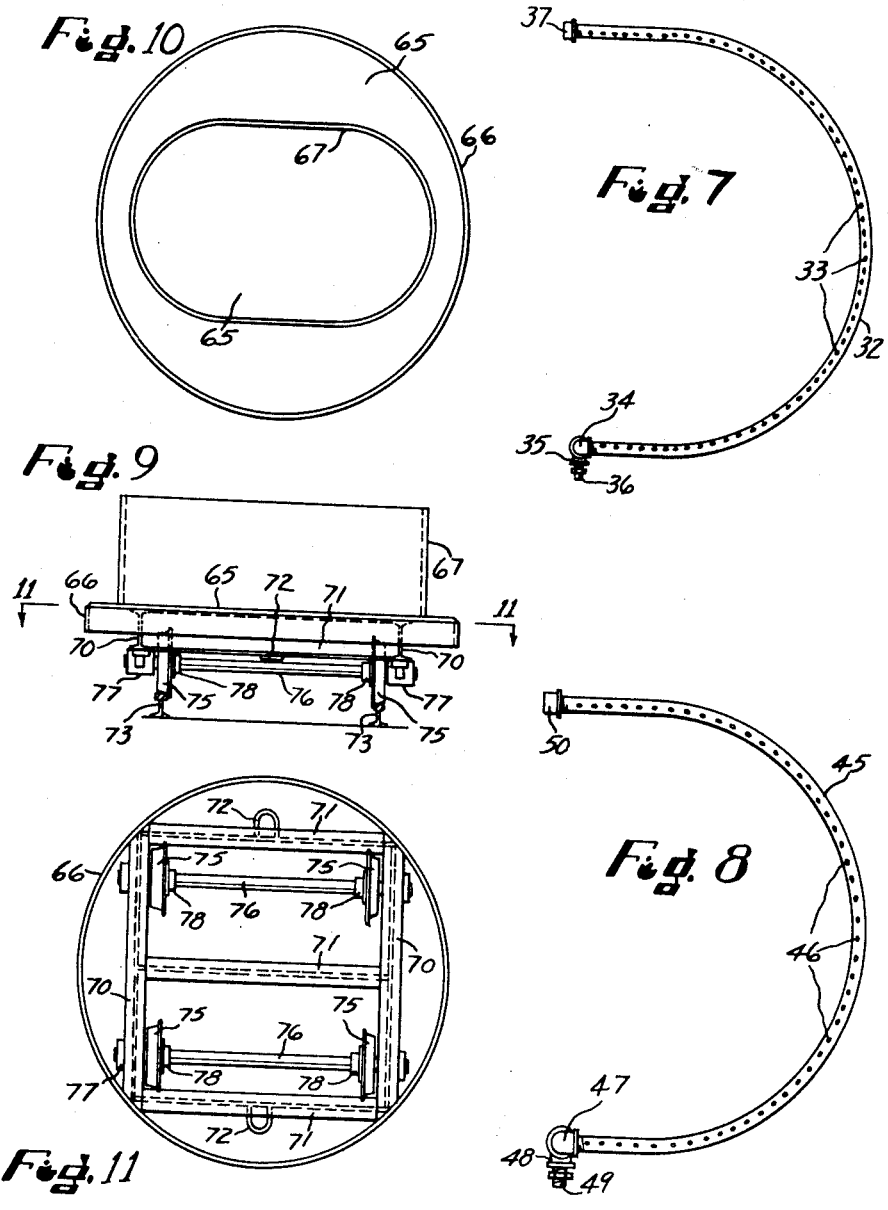

3,161,471
ARC FURNACE PROCESS FOR THE PRODUCTION OF BORON CARBIDE
John J. Scott, Willoughby, Ontario, Canada, assignor to Norton Company, Worcester, Mass., a corporation of Massachusetts
Filed Feb. 25, 1958, Ser. No. 717,452
4 Claims. (Cl. 23—208)

The invention relates to the production of boron carbide. This application is a continuation in part of my copending application Serial No. 455,934, filed September 14, 1954, now abandoned, which was a continuation in part of my copending application Serial No. 370,517, filed July 27, 1953, now abandoned.

One object of the invention is to reduce the cost of synthesizing boron carbide. Another object is to increase the total production of boron carbide the potential demand for which, even at present high prices, appears to be greater than the maximum productive capacity of the currently used type of synthesizing equipment now available or which could be constructed in the near future. Another object is to reduce the amount of electric energy required for the synthesis of one pound of boron carbide, thus making it possible to produce more boron carbide, for there is only just so much electric energy available. Another object of the invention is to provide a simple and easily controlled process for the synthesis of boron carbide in large quantities. Another object is to provide a process for synthesizing boron carbide which can be performed with less electrical equipment than required for the resistance furnaces heretofore used, i.e. by dispensing with the costly voltage regulator. Another object is to avoid contamination of the carbide product produced. Another object is to reduce the volume of molten carbide present at any given time in the furnace available for contamination by air.

Other objects will be in part obvious or in part pointed out hereinafter.

Figure 12:
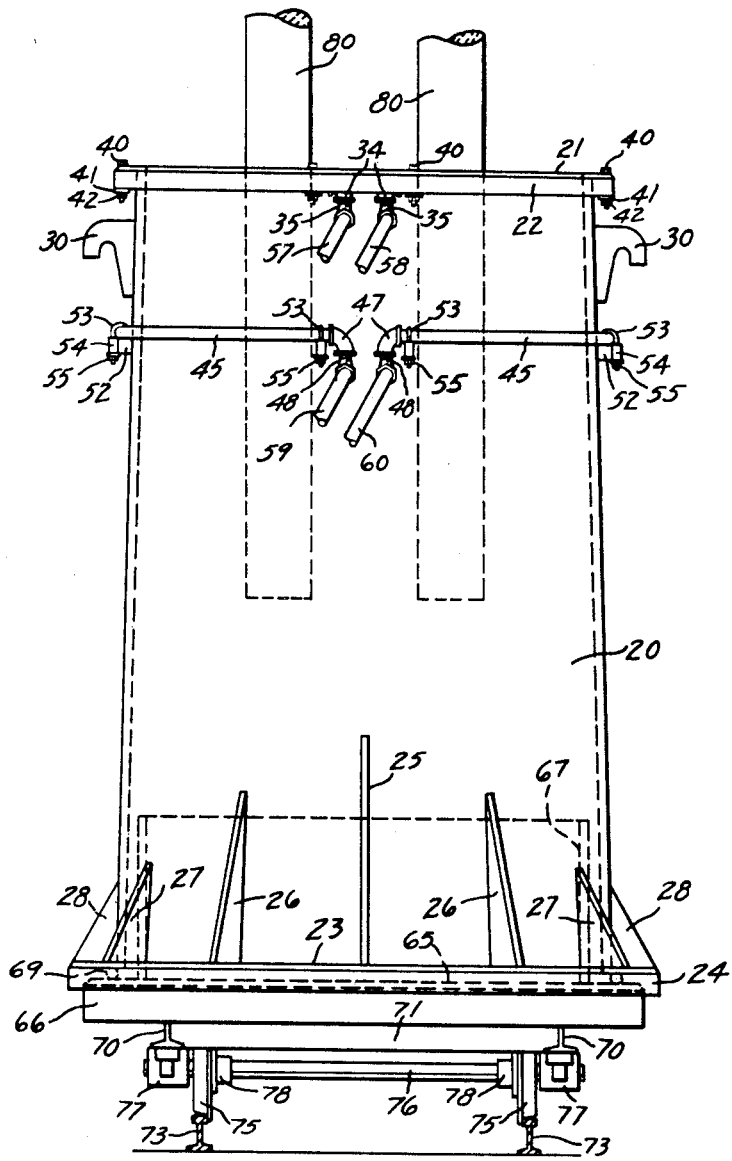
Figure 13:
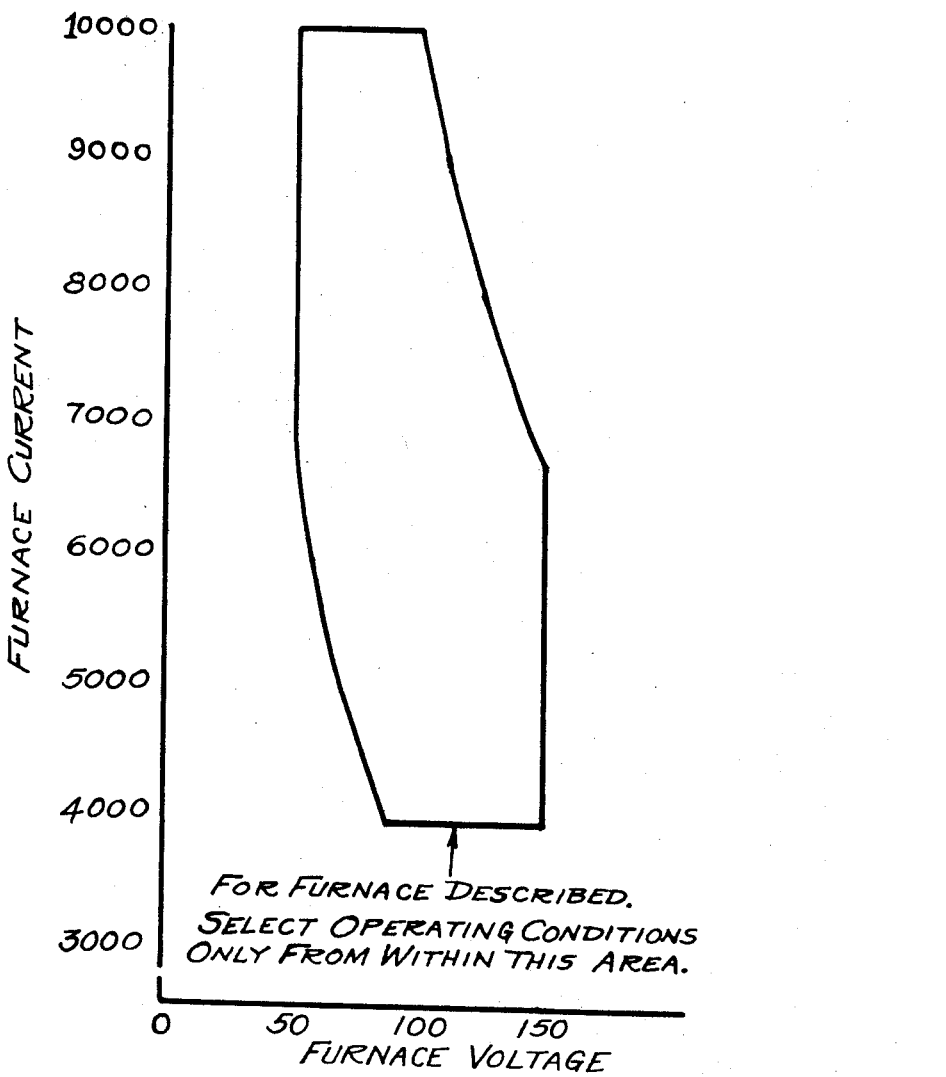
Figure 14:
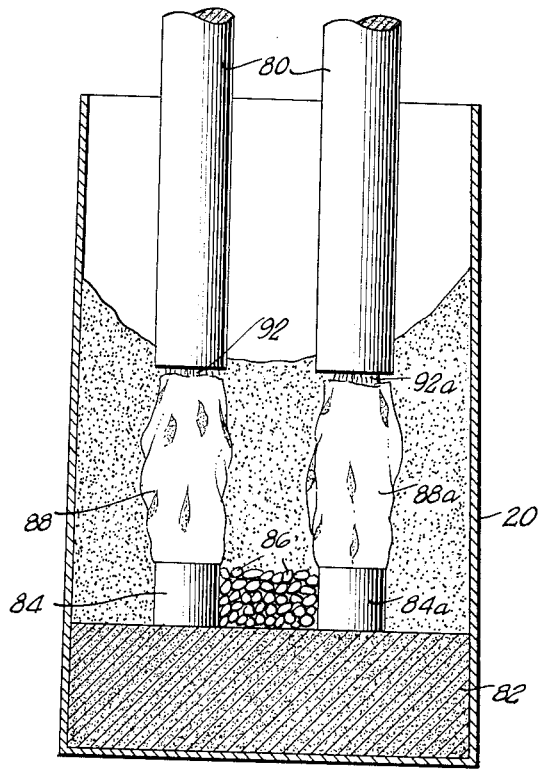

In the accompanying drawings illustrating one type of arc furnace by means of which the process of the invention can be carried out, FIGURE 1 is a front elevation of the furnace shell, FIGURE 2 is a plan view of the furnace shell, FIGURE 3 is a sectional view of the furnace shell, the section being taken along the line 3—3 of FIGURE 1, FIGURE 4 is a sectional view of the wall of the furnace shell, the section being taken along the line 4—4 of FIGURE 2, FIGURES 5 and 6 are fragmentary sectional views taken on the lines 5—5 and 6—6 respectively of FIGURE 1, FIGURES 7 and 8 are plan views of water-cooling pipes, FIGURE 9 is a front elevation of a furnace bottom truck, FIGURE 10 is a plan view of the furnace bottom truck, FIGURE 11 is a sectional view taken along the line 11—11 of FIGURE 9, FIGURE 12 is a front elevation of the furnace completely assembled, illustrating the carbon or graphite electrodes and the track upon which the wheels of the truck rest, FIGURE 13 is a graph showing the operating conditions for the furnace described, FIGURE 14 is a diagrammatic elevational view of the arc furnace in operation producing separate ingots of carbide material under each electrode.

Referring now to FIGURES 1, 2, and 3, the furnace shell 20 can be made out of two pieces of steel plate welded together. Its shape is oval, tapering from the bottom to the top, and the shape is sufficiently indicated in FIGURES 1, 2, and 3. As shown in FIGURES 1, 4, and 5 at the top of the shell 20 is welded a lip 21 to which is welded a depending skirt 22. At the bottom of the shell 20 is a large flange 23, which also can be made of steel plate and welded to this flange 23 is a depending skirt 24. As clearly shown in FIGURE 3 the outer contour of the flange 23 is circular while the inner contour is oval; the flange 23 is welded to the shell 20. Steel ribs 25, 26, 27, and 28 are welded to the shell 20 and to the flange 24 and serve to give this unit great strength.

Hooks 30 made of steel plate are welded to the outside of the shell 20, near the top, at opposite ends of the long axis of the oval. These hooks 30 can be engaged by the hooks of chain falls connected to an overhead hoist, not shown, for the purpose of lifting the unit comprising the shell off the product of the fusion when the latter has cooled sufficiently.

A pair of bent pipes 32, one of which is shown in FIGURE 7 and the other of which is identical therewith except that it is of the opposite hand, are provided with very fine holes 33 which are preferably located (when the pipes 32 are in place as shown in FIGURES 4 and 5) to throw water upwardly and inwardly; for example they can be 30° from the top and on the inside as illustrated. At one end of each pipe 32 is a pair of elbows 34 and 35 connected to each other and to a nipple 36. At the other end of each pipe 32 is a cap 37 to plug the free end of the pipe whereby to compel the water to issue through the holes 33. The pipes 32 can be supported under the lip 21 in any manner; as illustrated in FIGURES 2 and 5 it will suffice to provide four bolts 40 extending through the lip 21 upholding bars 41 by means of nuts 42, and the pipes 32 simply rest upon the bars 41.

FIGURE 8 illustrates one of a pair of bent pipes 45, of which one is as shown and the other is of the opposite hand, and these pipes 45 have holes 46 and are equipped with elbows 47 and 48 and a connecting nipple 49 on one end and caps 50 on the other end. As shown in FIGURES 1 and 6 these pipes can be supported close to the shell 20 by means of lugs 52 welded to the outside of the shell 20 together with bent bolts 53 passing through pipe sleeves 54 welded to the lugs 52 and with nuts 55 to draw the bent bolts firmly against the pipes 45. Illustratively the holes 46 can be oriented as shown in FIGURE 6, but this is not critical so long as they are located to throw the water inwardly since at the locus of pipe 45 there is already a cascade of water.

The pipes 32 and 45 are, of course, connected to water supply as by means of hoses 57, 58, 59 and 60 illustrated in FIGURE 12, so that at all times when the power is on, the shell 20 is cooled by a cascade of water. Although the synthesis of boron carbide takes place at about 2400° C. and above and steel plate melts at around 1500° C., the cascade of water over the shell 20 coupled with the fact that steel is highly thermally conductive protects the shell 20 from melting. The cascade of water hugs the surface of the shell 20 and covers all parts of it from the top down and is assisted in so doing by the taper of the shell. Also it may be remarked that the shell 20 quickly acquires a coating of rust, which is easily understood since it is alternately wet and dry and frequently quite hot, and the rust makes it much more wettable than clean unrusted steel.

Referring now to FIGURES 9 and 10, the furnace bottom truck comprises a circular table 65 made of steel plate to which is welded a depending skirt 66 also made of steel plate. To the upper surface of table 65 is welded an oval bottom container 67 made of steel plate. This oval bottom container 67 has the same shape as the bottom of the shell 20 as shown in FIGURE 3, but the oval container 67 is slightly smaller in size so that the shell 20 and flange 23 can be placed over the container 67 and on the table 65. As shown in FIGURE 12, when the shell 20 is placed on the bottom with the flange 23 on the table 65, a hose 69 is interposed to act as a seal. This hose 69 is a plain piece of rubber hose without couplings or other fittings and simply acts as a cushion and sealing means, and extends all the way around the table 65 with the ends thereof overlapping.

Referring now to FIGURES 9 and 11 a pair of parallel steel I beams 70 are welded to the bottom of the table 65 and a plurality of I beams 71, for example three of them, are also welded to the bottom of the table 65. These I beams 71 are desirably perpendicular to the I beams 70. To the outer I beams 71 are welded U-shaped bars 72, for the purpose of connecting a hook of a chain to the truck to draw it along the track 73 illustrated in FIGURE 12.

Resting upon the track 73 are four flanged wheels 75 on steel axles 76 journalled in bearing boxes 77 which can be iron castings. The wheels 75 are located between the bearing boxes 77 and collars 78 on the axles 76. The bearing boxes 77 are welded to the under sides of the steel I beams 70.

Practical dimensions for the furnace described are, height of shell 20 about nine feet, other dimensions in proportion, and such a furnace can hold about 15,000 pounds of mixture and boron carbide made therefrom.

I provide, for the synthesis of boron carbide in the arc furnace described, a mixture of boric acid anhydride, often called boric oxide, $B_2O_3$, and coke but, after the first run of the first furnace (which is already past history) I find it preferable to provide a quantity of "old mix" to be added to the mixture of $B_2O_3$ and coke. Old mix is mixture from a previous run of a furnace and differs from new mixture in that some part of it is usually partially converted material. In other words there is in old mix some boron compound having less oxygen than $B_2O_3$ and some boron carbide having more carbon than $B_4C$. The boric acid anhydride and old mix may be collectively referred to as "boron oxide ore." Old mix is also called reclaim material which includes unconverted material and partially converted material.

The furnace mixture that I use to make boron carbide usually contains more boron than is represented by the equation:

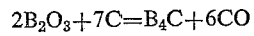

$$2B_2O_3 + 7C = B_4C + 6CO$$

This is because a good deal of boron is lost during the process. Using the stoichiometric proportions represented by the equation, I would expect to obtain a boron carbide having excess carbon as graphite. I may use from the stoichiometric proportion up to 65% excess boron above the stoichiometric proportion according to the equation. Actually, since in my mix there is usually some boron oxide richer in boron than $B_2O_3$ and some boron carbide lower in boron than $B_4C$ (partially converted material from a previous run), I use proportions of from the stoichiometric proportion of the boron to the free carbon of the coke up to 65% excess of boron over said stoichiometric proportion.

The amount of free carbon in the coke is of course calculated. I prefer to use a well calcined coke principally because the amount of free carbon therein can be determined with more accuracy. I can use various kinds of coke, petroleum coke, metallurgical coke or pitch coke, but in general I find pitch coke is more uniform in quality and this usually has 90% or more free carbon and is low in ash content, below 1%. I prefer to select coke having less than .5% ash content.

Boric acid anhydride may readily be made by driving the elements of water out of boric acid, $H_3BO_3$, with heat, but as this has been known for years and since boric acid anhydride glass is readily available on the market as a crushed glass powder, it seems to be unnecessary further to describe the preparation of this readily available compound. This ingredient is hereinafter frequently referred to as just "glass."

All grades of boron carbide except the very purest quality material contain some free carbon in the form of graphite. About 5% or even a little more of free carbon in the boron carbide, $B_4C$, does not destroy its usefulness as abrasive material and for many years large quantities of boron carbide containing about 5% of graphite have been marketed as abrasive material which was thoroughly satisfactory to the users. Elementary boron can exist in solid solution in boron carbide, $B_4C$, and boron carbide empirically designated $B_8C$ has been made. For certain uses it is preferred to have boron carbide with more boron in it than $B_4C$. My present process can make the high boron product as rich in boron as $B_{6.6}C$. This, as well as the boron carbides still richer in boron, is referred to in the arts as technical boron. $B_{6.6}C$ has, as will readily be found, about 85.6% of boron.

In order to make the high boron product, it suffices to add an excess of the $B_2O_3$ up to 65% excess boron as stated. When large proportions of boric oxide are used for the purpose of making boron carbide especially rich in boron, the product contains some $B_2O_3$ glass, but this can be washed out with water.

The anhydride glass is intimately mixed with coke and the new mix is further intimately mixed with the old mix. I can use coarse glass and/or coke or fine glass and/or coke, but the finer the particle sizes, the quicker and the more complete is the reaction. The finer ingredients are more expensive. I have used the $B_2O_3$ glass through ½ inch mesh, there being of course many fine particles. The coke can be used as it comes, which is from ½ inch lumps to very fine particles. It is satisfactory to have as much as 50% of old mix and as a matter of fact the process can be run with 100% of old mix provided the elements are present in the proper proportions.

Before assembling the shell 20 and the bottom container 67, I form a carbon bottom in the container 67 in any suitable manner, such as by tamping in a mixture of fine carbon and pitch. This carbon bottom should be concave on the top and on the periphery should extend to the top of the container 67. After assembly of the shell 20 and bottom container 67, I pack coke between the outside of the container and the inside of the shell and then add regular alumina fines to the shell 20 to extend to a rather uniform level about four inches above the top of the container 67 (assuming a nine foot high shell 20). This is also a bottom.

I now place a mass (for example about 75 pounds) of lump graphite or carbon right under the eventual loci of the electrodes 80 (see FIGURE 12) in which, when the furnace has been moved to operating position, are the foci of the oval of the shell 20. Electrically connecting these masses of carbon or graphite (termed carbon) I build a bridge of graphite or carbon with this lump material which bridge extends from one locus to the other locus. I form a trough in the reclaim material and/or ore for the lumps.

The bridge of graphite lumps forms a continuous electric current path from the area under one electrode to the area under the other electrode and the cross section of this path is preferably about fifty square inches for the large furnace described. Maximum and minimum permissible cross section of the bridge will be discussed hereinafter. I energize the electrodes 80 at an E.M.F. of from 50 to 150 volts, preferably 120 volts and then, having moved the truck on the track 73 to place the shell 20 in the proper position as above defined, I lower the electrodes into contact with the graphite. During the entire process the electric current flows through the bridge.

The electrodes are controlled by the usual overload-underload "servo" controlling mechanism and electric motor powered lifting and lowering mechanism, together with a circuit breaker to protect the electrical equipment. Since such electrical mechanisms are known and belong to an art other than the art of producing boron carbide, they will not be described herein.

When the electrodes 80 contact the bridge of graphite electric current flows at about 4000 amperes or more. The "servo" mechanism causes the electrodes 80 to hunt up and down maintaining the arcs with a current flow (when the E.M.F. is 120 volts) of about 6700 amperes.

Now I shovel mixture all over the area of the furnace to a depth of about two inches. Some mixture gets right into the loci of the arcs and there the reaction takes place, forming boron carbide and releasing carbon monoxide. The conditions are reducing and the blanket of mix keeps the air away from the zone of reaction in the loci of the arcs. While it is preferable to have the blanket of mixture about one inch minimum depth at the electrodes and measuring from the bottoms of the electrodes, in some cases I can operate the furnace without any blanket at all; any blanket of mix should not be more than about three inches as I want the gasses to escape.

It now suffices to charge the furnace from time to time with mixture. Away from the electrodes the mix should be banked high all around the inside of the shell 20. For example, it may be four inches higher at the shell than at the electrodes, and even higher, up to a foot higher at the ends of the long horizontal axis of the shell 20.

As mixture is fed from time to time into the furnace, the electrodes gradually rise as ingots of boron carbide are formed in the loci of the arcs. No considerable pool of molten boron carbide is formed; the reaction produces a boron carbide which is incandescent and some liquid phase may exist but for the most part the liquid phase is momentary only. The temperature of the formation of boron carbide is now believed to be close to 2350° C.

The operation of the furnace part way through a run as described above is illustrated in FIG. 14, which shows the base layer 82 of ore, reclaim material or comparable material supporting the large lumps 84 and 84a of graphite or carbon under the loci of the electrodes 80. Between the carbon lumps 84 and 84a is the bridge of graphite or carbon lumps 86 and extending substantially between the bottom of each electrode 80 and the corresponding large carbon lump 84 or 84a are the fused ingots 88 and 88a of carbide material. Surrounding the bottom ends of the electrodes 80, ingots 88 and 88a and carbon bridge formed of lumps 84, 84a and 86 is the mass of reaction mixture 90, which as exampled above will rise higher and higher in the shell 20 as the production run proceeds. The path of electric current during the operation is from one electrode 80 via an arc 92, through the ingot 88, the lump 84, then the lumps 86, next the lump 84a, then the ingot 88a, and finally through the arc 92a to the other electrode.

When the run has been completed, and the electrodes lifted, it is convenient to draw the truck along the rails 73 to remove the entire furnace from under the electrodes so that, for example, another similar furnace may be set up underneath them to start another run of the process. However, for a long time the cascade of water is maintained on the shell 20, preferably at least through the hoses 57 and 58 to the pipes 32. This cascade of water is maintained until the contents of the shell 20 have cooled sufficiently so that there is no more danger of burning the shell. Usually this takes about sixteen hours. The furnace shell is not lifted until the contents have cooled sufficiently so that the carbide will not oxidize when it comes into contact with the air. In a 15,000 lb. furnace shell this is about 40 hours from the time the furnace is shut down. At the end of that time, the furnace shell is lifted off the ingots and what is now reclaim material, most of which is fused into a solid mass. Two ingots of boron carbide are found embedded in the mix. The ingots are carefully separated from what is now reclaim material and the latter is collected for use in a subsequent run of the process.

EXAMPLE I

The carbon bottom in the container 67 having been formed as above described, the shell 20 having been placed upon the table 65 as described, coke having been packed between the outside of the container and the inside of the shell, regular alumina having been added to extend to the uniform level about four inches above the top of the container 67, and 75 pounds of lump graphite having been placed under the eventual loci of the electrodes, and the bridge having been formed as above described, the furnace operation was started at 120 volts and mix was shoveled into the furnace to keep a cover of mixture about two inches deep around the electrodes 80 and between them. The mixture was 41.5% old mix and 41.5% glass, 17% coke. The old mix had the following composition.

Table I

Composition of old mix:
  Boron _____ 19.07%.
  Carbon _____ 40.83%.
  Oxygen _____ Most of the remainder.

The material recovered from this run was sorted according to visual appearance and analyzed. The greater portion of the material was spongy material having the analysis: carbon 24.44%, boron 69.27%, and the remainder mostly oxygen. This is useful boron carbide for lapping powder and other purposes and if it is desired to get rid of most of the oxygen, this can be accomplished by crushing the material fine and washing with water, which will reduce the oxygen content to less than one percent. The 17% coke in the mixture had about 90% free carbon.

Another portion of the product was what is called solid, being in massive pieces, and this had the composition: boron 71.77%, carbon 23.93%, and the remainder mostly oxygen. This is also useful boron carbide and the oxygen content can be lowered to less than one percent in the same manner as above.

Another portion of the material called "fire sand" is on the borderline between good boron carbide and "old mix" to be recycled. It is customary to use most of the "fire sand" material by mixing it with other material richer in boron. This particular lot of fire sand material has the composition: boron 61.11%, carbon 28.55%, and the remainder mostly oxygen.

The remainder of the material was "old mix" to be recycled and had the composition: boron 23.43%, carbon 34.20%, and the remainder mostly oxygen. "Recycle" means to use again as feed in a subsequent furnace operation.

It must be understood that the product analysis varies from zone to zone to the pig. One sample of spongy material analyzed boron 75.63%, carbon 22.81%, giving a boron to carbon atomic ratio of 3.68.

EXAMPLE II

Another run was made exactly as in the case of Example I except that there was 52.5% of old mix and 31.5% of glass and 17% coke. The old mix had the following composition.

Table II

Composition of old mix in feed:
  Carbon _____ 35.95%.
  Boron _____ 24.11%.
  Oxygen _____ Most of the remainder.

The 17% coke had about 90% free carbon.

As the result of this run the solid and spongy portions combined had an average analysis of boron 67.60%, carbon 25.67%, with total boron and carbon 93.27%, and the remainder mostly oxygen. The fire sand was boron 59.59%, carbon 27.86%, total boron and carbon 87.45%, and the remainder mostly oxygen. The old mix resulting from the run (to be distinguished from the old mix used as feeding material) analyzed boron 24.31%, carbon 33.63%, total boron and carbon 57.94%, and the remainder mostly oxygen. I took several lots of this boron carbide mixture analyzing about 67.6% boron and 25.67% carbon and washed out most of the small amount of glass therein thus reducing the oxygen content (as $B_2O_3$) to less than 1%. The analysis of this final water washed material is given in the following table.

*Table III*

Final composition of good grade material produced according to Example II:

| | Percent |
|---|---|
| Boron | 74.44 |
| Carbon | 24.06 |
| $B_2O_3$ | 0.25 |

About 66% of the material produced according to Example II had the average analysis, before washing of boron 67.60%, carbon 25.67%, total boron and carbon 93.27%, and the remainder mostly oxygen. Percentages given are by weight in all the tables and elsewhere.

One of the especial features of the present process is having an electrically conductive path for the current between the arcs consisting of two ingots of boron carbide separately formed under the electrodes plus the carbon bridge underneath the ingots. When finally the furnace has been filled with mixture to the brim, the power is cut off and electrodes are raised. Of course the cascade of water was flowing over the furnace shell 20 at all times during the run of the process. However it may be noted that the temperature above the top of the furnace during the production of boron carbide therein as described is nowhere near as great at is is above, for example, the top of an arc furnace fusing bauxite. In the latter case a man's hand would be quickly burned if placed in the area just above the furnace but even a bare hand will not be burned if momentarily placed above the furnace making boron carbide as herein described.

Another feature of the invention is the layer of alumina below the graphite or carbon bridge. This serves as an insulating layer to prevent short circuiting of the electric current path. I find that so-called regular alumina is best; this is made by fusing and reducing bauxite in the known manner and has about 5% impurities. However, other varieties of alumina could be used, such as the white, very pure variety or natural corundum. Also I could use titania or zirconia, which are refractory to varying degrees.

With regard to the electrical parameters, if the E.M.F. is above 150 volts, the circuit breaker will operate too frequently and mechanical difficulties are encountered. I have not found it practical to use higher voltages. Under 50 volts it is difficult to make a satisfactory product in reasonable quantity.

The important parameters in this invention are the parameters of the electromotive force, the proportion of boron relative to the stoichiometric proportion as determined by the equation, and the parameters of the bridge. With regard to the latter, the cross section of the bridge is the criterion, since the bridge length is simply determined by the fact that it extends from under one electrode to under the other electrode, referred to as the loci of the electrodes.

The important feature of the cross section of the bridge is its area since the shape can vary widely within reason. This area is given as a function of the electrode diameter as I know of no other practical way to state it. The electrode diameter can be almost anything depending upon the size of the furnace. If the electrode is square, triangular or some other shape in cross section, its "diameter" is taken as a function of its area A as if it were a circle. The diameter D of any circle is equal to $$2\sqrt{\frac{A}{\pi}}$$

and for any figure the effective diameter D can be found by the equation $$D = 2\sqrt{\frac{A}{\pi}}$$

Now if D is the diameter of the electrodes and C is the area of the cross section of the bridge in inches and square inches respectively, I find that the minimum value of $C/D$ is 2 and the maximum value of $C/D$ is 12. Thus I can state the bridge cross section by the formulae $$C/D \not< 2 \quad \text{and} \quad C/D \not> 12$$

In the practice of my invention I prefer to use the oval shell and two electrodes, with single phase power. However three phase power could be used, with three electrodes, and then the shell should be trilobed or round.

The arc furnace described, synthesizing boron carbide consumes approximately 0.04 pound of electrode for every pound of product made. This is only about 5.5% of the amount of carbon resistor consumed in the resistance furnace per pound of boron carbide made. The arc furnace described requires only about 59% of the amount of power required in the resistance furnace, for the synthesis of boron carbide. Furthermore, the production rate of the arc furnace described is much greater than that of the old resistance furnace, in the synthesis of boron carbide.

The furnace shell 20, the table 65 and the oval bottom container 67 are stated to be made of steel. Steel is a variety of iron and other varieties of iron could be used, and also other metals could be substituted. Mixtures of two or more of the refractory materials alumina, titania and zirconia could be used for the furnace bottom under the carbonaceous bridge.

By free carbon I mean available carbon available for reaction according to the equation. This is referred to by many as fixed carbon. Since graphite is a form of carbon and since amorphous carbon can be used for the bridge as well as graphite, in the claims the expression "bridge of carbon" or the like is to be construed as covering a bridge of graphite or a bridge of amorphous carbon.

It is well known that boron readily unites with nitrogen to form boron nitride, BN. Furthermore hot boron carbide at or near its temperature of formation 2350° C. will react with nitrogen to convert some of it to boron nitride. It is surprising, therefore, my process yields a good grade of boron carbide in large quantities and with the economies hitherto explained since there is little to exclude atmospheric air from the reaction zone except the blanket of mix and it is surprising that you could so well exclude the nitrogen and as indicated I can get pretty good results without a blanket at all. This is more especially so since there is no substantial pool of molten boron carbide formed; instead the boron carbide ingot on the top is incandescent. Obviously if a pool were formed it would always be at the bottom of the furnace and at a level from side to side but according to the present process ingots are formed in columns which cover only a small fraction of the area of the furnace. Hence, after a given amount of material has been converted to boron carbide the top of the ingot where it is hot will stand much higher than if the same amount had been converted to the liquid phase. This particular feature of building up column-like ingots inside of a large furnace surprisingly enough gives better results than trying to form a pool of molten material in the bottom as the process proceeds.

In the patent to R. R. Ridgway, No. 2,285,837, a process of producing carbides, including boron carbide, in an arc furnace is described. In this Ridgway process a molten pool of the carbide is formed, as shown in the drawings and as stated on page 3, left hand column, line 9. This was found to cause reoxidization of the carbide resulting in a low grade product. The theory that the use of a deep furnace would avoid oxidization and nitriding was valid only in part. By avoiding the formation of any substantial pool of molten carbide, the process herein described is a much more practical arc furnace method of making boron carbide and produces a better product.

Further details of the operating conditions for a furnace of the size illustrated and described which also hold for furnaces of about the same size with electrodes approximately as described are as follows:

The first adjustment to be made when the furnace is ready to start is to set the voltage at a suitable value. The range of voltages that can be used with the furnace noted above is from 50 to 150 volts, the recommended value for best operation being 120 volts. The next adjustment is the current level. The current controller raises or lowers the electrodes automatically to maintain a predetermined current. The range of currents that can be used is from 4,000 to 10,000 amperes, the optimum value being 6,700 amperes. Under optimum conditions, this size and type of furnace therefore runs at 120 volts and 6,700 amperes, corresponding to a total input of 800 kva. This type of furnace runs at a power factor sufficiently close to unity for us to speak of kva. and kw. interchangeably, so I shall call this 800 kw.

The ranges of voltage and current noted above still do not specify completely the possible operating conditions. For example 150 volts at 10,000 amperes would cause erratic furnace operation while 50 volts and 4,000 amperes would reduce the rate of production to an uneconomically low level. A further limitation must therefore be placed on the operation, restricting the power level to the range from 350 to 1000 kw. FIGURE 13 shows graphically the permissible operating conditions.

The discussion above describes a comparatively wide range of power levels, roughly three to one. It is to be expected that the resulting product will differ in some respects, depending on the particular set of operating conditions selected, and this expectation is borne out by experience. For one thing, the power level will determine the diameter of the twin ingots that grow in the furnace. Thus, at the lower limit of 350 kw. the ingots will be about 14 inches in diameter, and at the upper limit of 1000 kw. they can be up to 24 inches in diameter. Since the electrodes are spaced 24 inches center to center, the latter figures represent a limiting condition under which the ingots begin to touch each other at some points. For another thing, the power level will influence the rate at which the ingots grow vertically. However, this rate of growth is taken care of automatically providing the raw materials are fed to the furnace at the specified rate, which I shall now discuss.

Probably the most important single consideration in the operation of the furnace is the control of the process of reaction and incipient fusion that makes it possible to grow ingots without at any time forming a molten pool of product in the bottom of the furance. This process is controlled by feeding the raw materials to the furnace at a predetermined rate. Thus the feed rate must be held between 0.8 and 1.2 lb. of raw mix per kw.-h. As an example, if the furnace is run at a power level of 1,000 kw., the total energy used in one hour is 1000 kw.-h. It will therefore be necessary to feed the raw mix to the furnace at a rate between 800 and 1200 lb. per hour. Since by no means all the feed is reacted in any one run, the overall consumption of electrical energy by the process is 9–12 kw.-h. per lb. of product.

It will thus be seen that there are as many distinct ingots of boron carbide as there are electrodes, and that the ingots are maintained substantially clear of each other so that the major path of the electric current after the process has been started is from one electrode to another electrode, via first an electric arc between an electrode and the boron carbide ingot under it, then through a mass of carbon, then through the bridge, then through another carbon mass, then through another boron carbide ingot and finally through an electric arc to the electrode directly above the ingot.

It will thus be seen that there has been provided by this invention a process for the production of boron carbide in which the various objects hereinbefore set forth, together with many thoroughly practical advantages are successfully achieved. As many possible embodiments may be made of the above invention and as the art herein described might be varied in various parts, all without departing from the scope of the invention, it is to be understood that all matter hereinbefore set forth or shown in the accompanying drawings is to be interpreted as illustrative and not in a limiting sense.

I claim:

1. The process of synthesizing boron carbide by the reaction of boron oxide ore and coke in an electric arc furnace while maintaining reducing conditions at the zones of reaction, which comprises forming in an electric arc furnace having vertically movable electrodes a furnace bottom of refractory oxide material, placing a mass of carbon above said bottom at the eventual locus of each electrode, forming a bridge of carbon above said bottom electrically connecting said masses maintaining said bridge of carbon at all times during the process, placing said electrodes at said loci in electrical contact with said masses of carbon and energizing said electrodes at from 50 to 150 volts, maintaining during the process a mixture of said boron oxide ore and coke around the bottoms of said electrodes and forming thereby as many distinct ingots of boron carbide as there are electrodes one ingot under each electrode, feeding said mixture of boron oxide and coke to around the bottoms of said electrodes at the rate of from 0.8 to 1.2 lbs. of mixture per kw.-h. of electrical energy energizing said electrodes, and maintaining the said ingots clear of each other whereby the path of the electric current after the process has been started is always from one electrode to another electrode, via first an arc, then through a boron carbide ingot synthesized by the process. Then through one of said masses of carbon, then through the bridge, then through another of said masses of carbon, then through another boron carbide ingot synthesized by the process, then by an arc to another electrode, and building up the boron carbide ingots synthesized by the process under the electrodes without the formation of any considerable pool of molten boron carbide as the electrodes gradually rise during the process by reason of the energization of the electrodes at 1 kw.-h. for each 0.8 to 1.2 lbs. of mixture fed.

2. Process according to claim 1 in which the cross section of the bridge in square inches divided by the diameter of the electrode in inches is between 2 and 12.

3. Process according to claim 2 in which the oxide material of the furnace bottom is mainly alumina.

4. Process according to claim 1 in which the oxide material of the furnace bottom is mainly alumina.

References Cited by the Examiner

UNITED STATES PATENTS

| | | | |
|---|---|---|---|
| 2,237,503 | 4/41 | Ridgway | 23—308 |
| 2,285,837 | 6/42 | Ridgway | 23—208 |

MAURICE A. BRINDISI, *Primary Examiner.*